US012717860B2

(12) United States Patent
Zhou et al.

(10) Patent No.: US 12,717,860 B2
(45) Date of Patent: Aug. 25, 2026

(54) INCREMENTAL STRUCTURED SUMMARIZATION USING GENERATIVE NEURAL NETWORKS

(71) Applicant: GDM Holding LLC, Mountain View, CA (US)

(72) Inventors: Yichao Zhou, San Jose, CA (US); EunJeong Hwang, Vancouver (CA); James Bradley Wendt, San Francisco, CA (US); Beliz Gunel, San Francisco, CA (US); Jing Xie, Bellevue, WA (US); Nguyen Ha Vo, Palo Alto, CA (US); Sandeep Tata, San Francisco, CA (US)

(73) Assignee: GDM Holding LLC, Mountain View, CA (US)

( * ) Notice: Subject to any disclaimer, the term of this patent is extended or adjusted under 35 U.S.C. 154(b) by 0 days.

(21) Appl. No.: 19/244,881

(22) Filed: Jun. 20, 2025

(65) Prior Publication Data

US 2025/0390544 A1 Dec. 25, 2025

Related U.S. Application Data

(60) Provisional application No. 63/662,411, filed on Jun. 20, 2024.

(51) Int. Cl.

| | |
|---|---|
| ***G06F 17/00*** | (2019.01) |
| ***G06F 16/34*** | (2019.01) |
| ***G06F 16/9538*** | (2019.01) |
| ***G06N 3/0475*** | (2023.01) |

(52) U.S. Cl.
CPC ........ *G06F 16/9538* (2019.01); *G06F 16/345* (2019.01); *G06N 3/0475* (2023.01)

(58) Field of Classification Search
CPC . G06F 16/9538; G06F 16/345; G06N 3/0475; G06N 3/045
See application file for complete search history.

(56) References Cited

U.S. PATENT DOCUMENTS 11,886,828 B1 * 1/2024 Gray .................. G06F 16/3344
12,008,332 B1 * 6/2024 Gardner .................. G06F 40/56
(Continued)

OTHER PUBLICATIONS

Agarwal et al., "Scisumm: a multi-document summarization system for scientific articles." Proceedings of the ACL-HLT 2011 system demonstrations, Jun. 2011, 115-120.
(Continued)

*Primary Examiner* — Greta L Robinson
(74) *Attorney, Agent, or Firm* — Fish & Richardson P.C.

(57) ABSTRACT

Methods, systems, and apparatuses, including computer programs encoded on computer storage media, for generating a structured summary of a content item that includes a sequence of segments. In particular, the described techniques include initializing a structured (according to an obtained schema data) summary of a content item and iteratively updating, for each segment in the sequence of segments included in the content item, the structured summary of the content item using a structured summary of the segment. The described techniques, use of structured summaries improves the content quality of summaries and improves the size of content items that can be summarized.

26 Claims, 6 Drawing Sheets

(56) References Cited

U.S. PATENT DOCUMENTS 12,400,072 B2 * 8/2025 Yee ........................ G06F 16/345
12,554,779 B1 * 2/2026 Hartmann ......... G06F 16/90332

OTHER PUBLICATIONS

Chang et al., "Booookscore: A systematic exploration of book-length summarization in the era of LLMs" CoRR, Submitted on Oct. 2023, arXiv:2310.00785v1, 31 pages.

Dagdelen et al., "Structured information extraction from scientific text with large language models." Nature communications 15.1, Feb. 2024, 1418: 1-14.

Gunel et al., "Strum-llm: Attributed and structured contrastive summarization." CoRR, Submitted on Mar. 2024, arXiv:2403.19710v1, 9 pages.

Hwang et al., "Sumie: A synthetic benchmark for incremental entity summarization" CoRR, Submitted on Jun. 2024, arXiv:2406.05079v1, 27 pages.

Jin et al., "A comprehensive survey on process-oriented automatic text summarization with exploration of llm-based methods" CoRR, Submitted on Mar. 2024, arXiv:2403.02901v1, 20 pages.

Kryscinski et al., "Booksum: A collection of datasets for long-form narrative summarization" CoRR, Submitted on May 2021, arXiv:2105.08209v1, 19 pages.

Li et al., "Long-context llms struggle with long in-context learning" CoRR, Submitted on Apr. 2024, arXiv:2404.02060v1, 16 pages.

Madaan et al., "Memory-assisted prompt editing to improve GPT-3 after deployment" CoRR, Submitted on Jan. 2022, arXiv:2201.06009v1, 14 pages.

Ouyang et al., "Training language models to follow instructions with human feedback." Advances in neural information processing systems 35, Dec. 2022, 15 pages.

Xia et al., "Fofo: A benchmark to evaluatellms' format-following capability" CoRR, Submitted on Feb. 2024, arXiv:2402.18667v1, 20 pages.

Xiong et al., "Effective long-context scaling of foundation models" CoRR, Submitted on Sep. 2023, arXiv:2309.16039v1, 23 pages.

Zhang et al., "Memory-augmented llm personalization with short- and long-term memory coordination" CoRR, Submitted on Sep. 2023, arXiv:2309.11696v1, 9 pages.

* cited by examiner

Figure 1B:
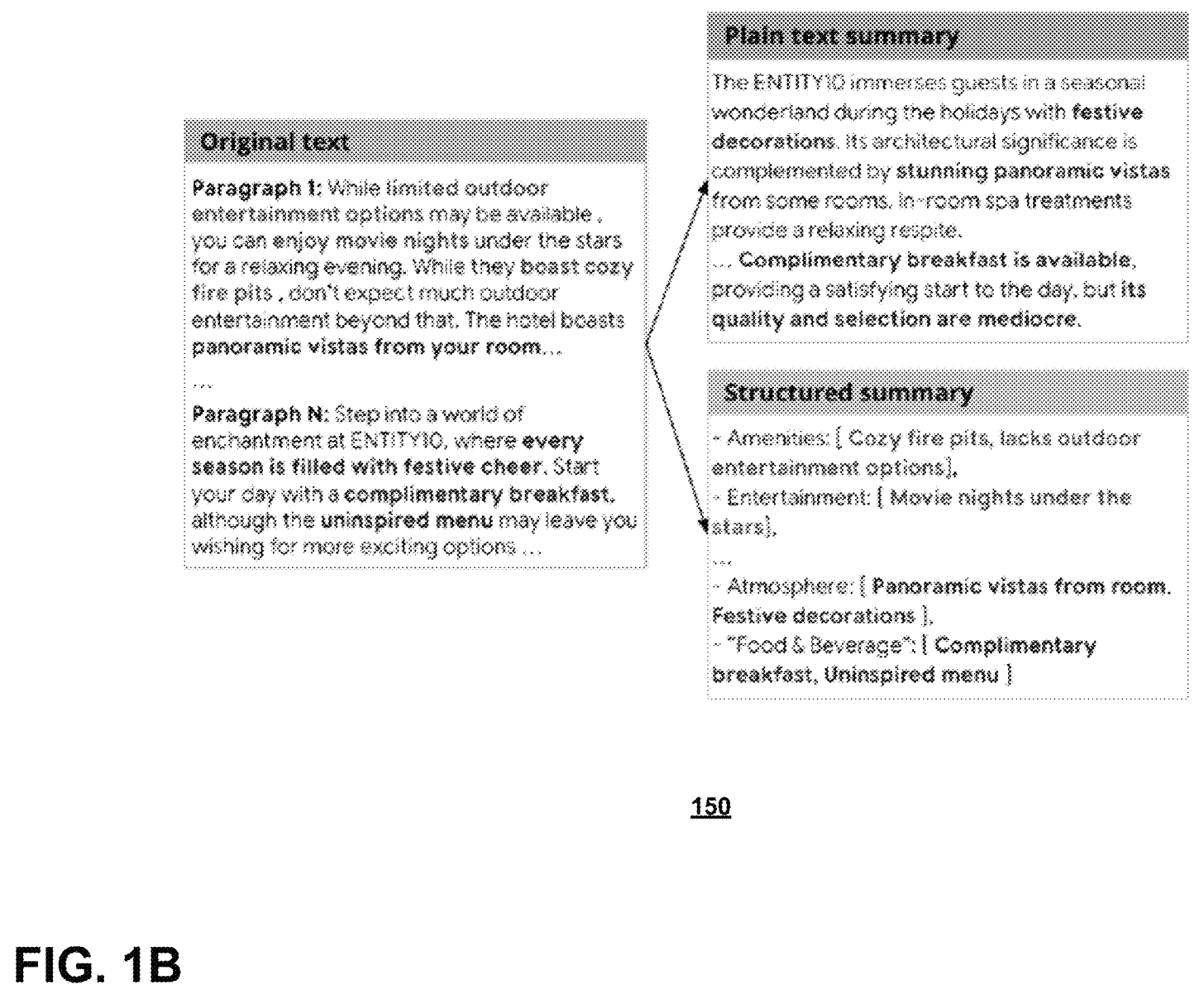

Original text

Paragraph 1: While limited outdoor entertainment options may be available , you can enjoy movie nights under the stars for a relaxing evening. While they boast cozy fire pits , don't expect much outdoor entertainment beyond that. The hotel boasts panoramic vistas from your room…

…

Paragraph N: Step into a world of enchantment at ENTITY10, where every season is filled with festive cheer. Start your day with a complimentary breakfast, although the uninspired menu may leave you wishing for more exciting options …

Plain text summary

The ENTITY10 immerses guests in a seasonal wonderland during the holidays with festive decorations. Its architectural significance is complemented by stunning panoramic vistas from some rooms. In-room spa treatments provide a relaxing respite.
… Complimentary breakfast is available, providing a satisfying start to the day, but its quality and selection are mediocre.

Structured summary

- Amenities: [ Cozy fire pits, lacks outdoor entertainment options],
- Entertainment: [ Movie nights under the stars],
…
- Atmosphere: [ Panoramic vistas from room. Festive decorations ],
- "Food & Beverage": [ Complimentary breakfast, Uninspired menu ]

| | Turn | Ultra | | | Pro | | |
|---|---|---|---|---|---|---|---|
| | | P | R | F1 | P | R | F1 |
| $GO_{text}$ | last | 86.2 | 42.7 | 56.4 | 85.8 | 40.4 | 54.1 |
| $GO_{json}$ | last | 91.2 | 58.9 | 70.9 | 85.1 | 61.0 | 70.1 |
| $GU_{text}$ | start | 77.3 | 70.0 | 72.6 | 74.7 | 66.9 | 69.7 |
| | last | 76.6 | 45.2 | 55.8 | 73.3 | 26.8 | 38.4 |
| | Avg. | 76.1 | 54.3 | 62.2 | 73.0 | 41.8 | 51.2 |
| $GU_{json}$ | start | 88.6 | 81.6 | 84.3 | 85.1 | 80.7 | 82.2 |
| | last | 80.2 | 76.7 | 78.1 | 81.7 | 69.4 | 74.7 |
| | Avg. | 80.9 | 78.9 | 79.4 | 83.4 | 74.0 | 77.9 |
| $GM_{json}$ | start | 88.6 | 82.9 | 85.0 | 84.2 | 82.6 | 82.6 |
| | last | 86.8 | 63.2 | 72.7 | 84.6 | 74.3 | 78.6 |
| | Avg. | 86.5 | 70.9 | 77.3 | **84.7** | 78.7 | 80.9 |
| $CoK_{json}$ | start | 89.1 | 77.8 | 82.8 | 81.1 | 80.5 | 79.9 |
| | last | 92.6 | 78.0 | 84.5 | 84.6 | 83.6 | 83.9 |
| | Avg. | **91.8** | **80.5** | **85.5** | 83.7 | **83.9** | **83.5** |

| Model | $GU_{text}$ | $GU_{json}$ | $GM_{json}$ | $CoK_{json}$ |
|---|---|---|---|---|
| Pro | 53.1 | 58.5 | 61.5 | **62.2** |
| Ultra | 51.9 | 61.7 | 60.1 | **63.1** |

INCREMENTAL STRUCTURED SUMMARIZATION USING GENERATIVE NEURAL NETWORKS

CLAIM OF PRIORITY

This application claims priority under 35 USC § 119(e) to U.S. patent application Ser. No. 63/662411, filed on Jun. 20, 2024, the entire contents of which are hereby incorporated by reference.

BACKGROUND

This specification relates to generating data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes systems and methods implemented as computer programs on one or more computers in one or more locations that can generate a structured summary of a content item that includes a sequence of segments. A summary succinctly represents the essential information of the content item; a structured summary is referred to as "structured" because the summary conforms to a schema that defines the organization of the summary.

Particular embodiments of the subject matter described in this specification can be implemented so as to realize one or more of the following advantages.

Generating summaries of content items from sources like webpages, books, articles, and so on is important to efficiently make available the information contained in the content items. For example, the summary of a content item (e.g., a natural language text summarization of a text based content item, e.g., a natural language text summarization that captures the main findings presented in a complex scientific journal article) can be important for use in performing downstream tasks (e.g., classification of the content item, "question answering" using the content item, and so on). That is, using the summary instead of the original content can improve the performance of the downstream tasks.

For example, processing a summary for a downstream task requires less computational resources (e.g., less computational memory, or less computational processing) than processing the original content item, and therefore, the downstream task can be used with larger content items.

As another example the summary can distill and provide the most relevant information for the downstream task to, therefore, improve the downstream task performance (e.g., improved accuracy for classification).

Presently, generative neural networks (e.g., language model neural networks) are often used to summarize content items. But, when content items are too large (e.g., the content item includes a large number of natural language words), the generative neural networks produce poor summaries of the content items (e.g., the summaries are inaccurate, redundant, or incoherent). One reason for the poor performance is that the content item size exceeds the context window size of the generative neural network (i.e., the maximum sized input the generative neural network can consider at once when generating an output). But, even if the original content item does not exceed the context window size of the generative neural network, if the content item is large, it can still be computationally expensive to process the content item using the generative neural network. For example, processing a content item with a large number of natural language words using a language model with a large context window is expensive even if the content item fits in the language model context window.

To mitigate the shortcomings of using a generative neural network to summarize a large content item, recent techniques include the use of unstructured memory systems.

Unstructured memory systems store one or more "memories" (i.e., information represented by the content item) for use in creating a summary of the content item. As an example, a memory system may store a memory (e.g., free-form natural language text summary) for each segment of a content item and later provide these memories to a generative neural network to generate a final summary of the content item. However, the use of an unstructured format for memories often results in oversized memories that still overload the generative neural network (i.e., the memories, while collectively smaller than the full content item, are still large enough to cause the generative neural network to generate poor summaries, e.g., due to exceeding the generative neural network's context window size).

Some techniques that include the use of unstructured memory systems attempt to address the issue of collectively large memories by iteratively updating a summary of the content item so that the context window of the generative neural network generating the summary only considers a subset of all the memories at a time. But these techniques can still suffer from the size of memories being too large and can have trouble efficiently updating the summary to include only relevant and non-redundant information. The memories being too large is due to unstructured summaries lacking a concise, consistent formatting, which results in more computational memory usage. The difficulty of efficiently updating the summary is also due to the unstructured summaries' lack of consistent formatting, which makes identification of relevant information more difficult than if a consistent format were used.

Recent techniques also include the use of fine-tuning of the generative neural network to mitigate the shortcomings of using the generative neural network to summarize a large content item. That is, recent techniques include further training a pre-trained generative neural network using an appropriate training data set so that the generative neural network, after fine-tuning, can better summarize large content items. Such techniques can be helpful in improving the performance of the generative neural network for summarizing large content items when previous training did not include summarizing large content items.

However, fine-tuning does not resolve the issue of a limited context window of a generative neural network, and introduces the costs of sourcing appropriate training data, using computational resources to train, and managing the training so that the generative neural network does not lose its summarization performance across a variety of content item types (e.g., size, included subjects, modalities, and so on).

This specification describes techniques that can address the aforementioned challenges by generating a structured summary of a content item that includes a sequence of segments. That is, this specification describes techniques that include initializing a structured (according to an obtained schema) summary of a content item and iteratively updating, for each segment in the sequence of segments included in the content item, the structured summary of the content item using a structured summary of the segment.

The described techniques' use of a structured format for the summaries of the segments has the advantage of making the summaries size efficient. For example, a structured format such as a JSON format for a structured summary of the segment (i.e., a memory) is much more size efficient than a free form natural language text summary that includes the same information because the JSON format organizes only essential information into key-value pairs while the free form text includes non-essential information. Thus, the use of a structured format for summaries of the segments (i.e., memories) alleviates the issue of a limited context window of a generative neural network.

The described techniques' use of a structured format for the summaries of the segments and the summary of the content item has the advantage of enabling efficient iterative updates of the summary of the content item. As an example, because a structured format such as JSON for a structured summary of content item organizes essential information into easily identifiable key-value pairs, a generative neural network can more easily add and/or modify particular key-value pairs of the structured summary of the content item for each segment summary. As a result, the final structure summary of the content item is a size efficient summary that includes relevant and non-redundant information of the content item.

By avoiding fine-tuning the generative neural network, the described techniques also have the advantage of avoiding the costs associated with further training the generative neural network.

The details of one or more embodiments of the subject matter of this specification are set forth in the accompanying drawings and the description below.

Other features, aspects, and advantages of the subject matter will become apparent from the description, the drawings, and the claims.

BRIEF DESCRIPTION OF THE DRAWINGS

FIG. 1B shows an example of a content item, a structured summary of the content item, and unstructured summary of the content item.

FIG. 3 is an example of the performance of the described techniques.

FIG. 4 is an example of the performance of the described techniques.

Like reference numbers and designations in the various drawings indicate like elements.

DETAILED DESCRIPTION

Figure 1A:
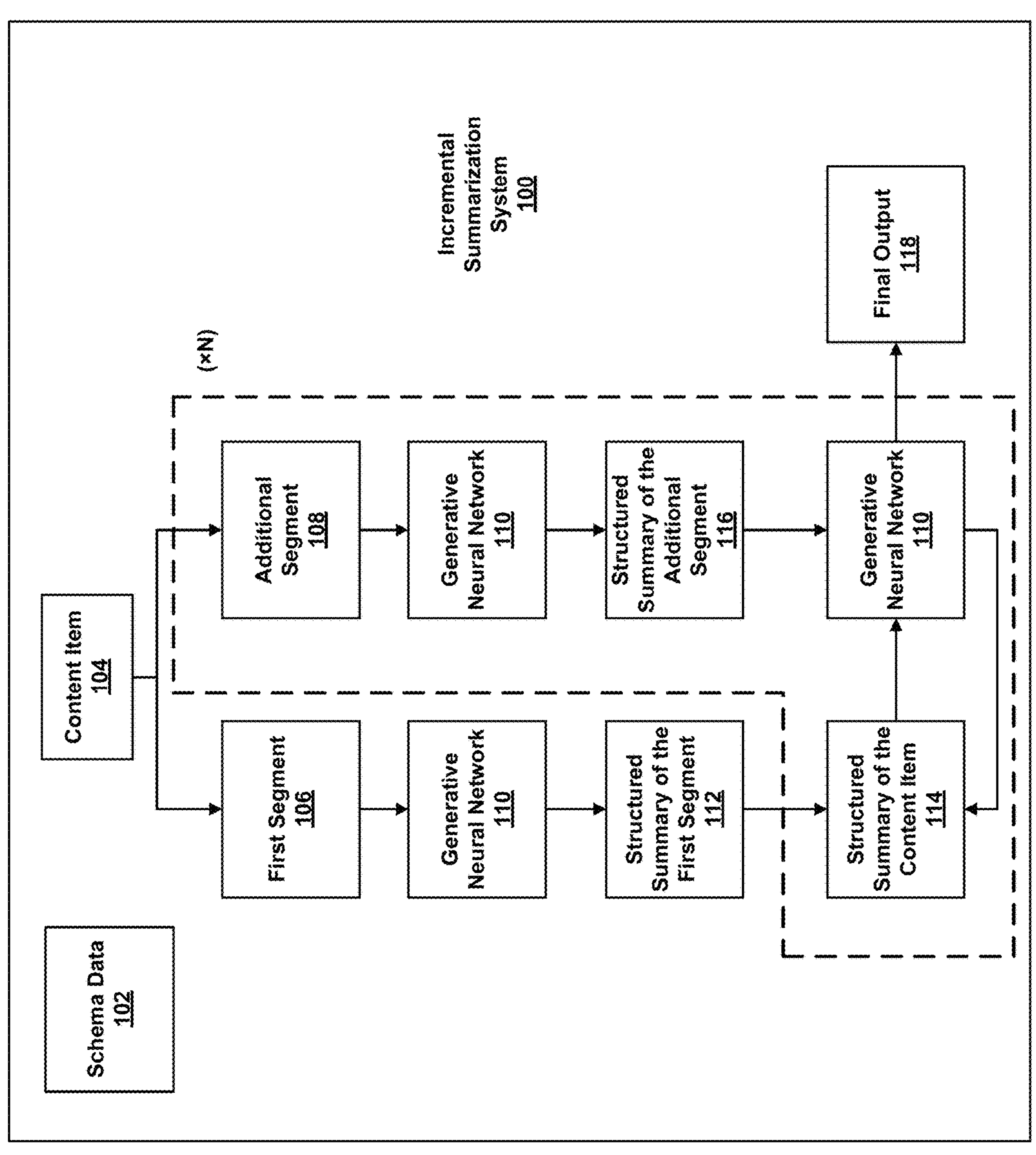
FIG. 1A shows an incremental summarization system.

FIG. 1A shows an example incremental summarization system 100. The system 100 is an example of a system implemented as computer programs on one or more computers in one or more locations, in which the systems, components, and techniques described below can be implemented.

The incremental summarization system 100 generates a structured summary of a content item 114 that includes a sequence of segments.

The content item 104 can generally be any appropriate content item that can be divided into portions ("segments").

For example, the content item 104 can be a collection of documents, e.g., relating to a particular set of one or more entities, so that the documents in the collection are respective segments of the content item. The particular entities can be any appropriate entities, e.g., any appropriate person, place, or thing.

A "document" is a piece of content. For example, a portion of a larger document. Examples of documents include text documents, e.g., pages, paragraphs, sentences or other text segments, and multi-modal documents, e.g., a piece of content that includes text and another modality, e.g., audio, video, or images.

For example, a content item can be a collection of documents, where each document is a paragraph. So, the collection of documents (and therefore, the content item) can be an article (i.e., a larger document).

As another example, the content item 104 can be a collection of images, so that each segment includes one or more of the images in the collection.

As another example, the content item 104 can be a video, so that each segment includes the video frames in a corresponding time window within the video.

As another example, the content item 104 can be an audio signal, so that each segment includes a corresponding time window within the audio signal.

As yet another example, the content item 104 can be a multi-modal collection of information about a particular set of one or more entities, e.g., that includes two or more of text, audio, image, or video data relating to the particular set of one or more entities.

A structured summary is referred to as "structured" because the summary conforms to a schema that specifies the structure for the summary. Generally, the system 100 obtains schema data 102 that defines the schema.

Generally, the schema specifies a set of keys that are related to the content item 104 and, optionally, requirements for the respective values for each of the keys. For example, the schema can be a schema in a particular structured data format, e.g., JSON, YAML, or XML.

Thus, a structured summary of the content item 114 satisfies the requirements of the schema, e.g., includes one or more respective values for each of one or more of the keys specified in the schema and/or does not include keys (and corresponding values) that are not specified in the schema.

A structured summary is in contrast to a natural language summary, which is written in natural language and is not required to conform to a schema (e.g., is not required to represent information using key-value pairs).

To process a given content item 104, the system 100 initializes a structured summary of the content item 114. To do so, the system 100 processes a first input that includes a first segment 106 in the sequence using a generative neural network 110 to generate a structured summary of the first segment 112 according to the schema.

The system 100 then initializes, using the structured summary of the first segment 112, the structured summary of the content item 114. For example, the system 100 can initialize the structured summary of the content item 114 to be the structured summary of the first segment 112.

The system 100 then iterates through the other segments in the sequence ("additional segments", i.e., one or more additional segments 108).

For each additional segment 108 in the sequence, the system 100 processes a respective additional input that includes the additional segment 108 using the generative neural network 110 to generate a structured summary of the additional segment 116 according to the schema.

The system 100 then processes one or more respective combining inputs using the generative neural network 110 to update the structured summary of the content item 114, where each combining input includes the structured summary of the additional segment 116 and the structured summary of the content item 114.

FIG. 1B shows an example of the structured summary of the content item 114 (i.e., the boxed item labeled "structured summary") after being updated for the last segment 108. In particular, FIG. 1B shows an example content item (i.e., the boxed item labeled "Original text") that is a collection of documents (i.e., paragraphs), the respective structured summary of the content item 114 (i.e., the boxed item labeled "structured summary") after being updated for the last segment 108, and an example natural language unstructured summary of the content item generated not using the methods and systems of this specification (i.e., the boxed item labeled "Plain text summary"). The structured summary of the content item 114 of example 150 shows it better serves as a summary of an entity present in the original text (where, for this example, the entity is a hotel) than the plain text summary produced through a generic system and/or method. The structured summary of the content item 114 better serves as a summary because it captures the relevant "amenities" information (present in paragraph one of the content item) while the plain text summary does not.

For example 150, the system 100 generated the displayed structured summary of the content item 114 according to a schema that defines the key-value pairing requirements. For example, because the schema specified a key requirement of "Atmosphere" with a corresponding value type requirement of "list of strings", the structured summary content item 114 includes the key "Atmosphere" paired with the list [Panoramic vistas from room, Festive decorations]. Also, for this example key-value pairing, the information included in this key-value pairing is much more compact and easier to identify than the same information present in the paragraph of the plain text summary.

After the last additional segment 108 in the sequence, the system 100 processes at least the structured summary 114 of the content item after being updated for the last segment 108 in the sequence to generate a final output 118 for the content item 104.

For example, the final output 118 can be a summary of the content item 104, e.g., a natural language summary or a structured summary.

As another example, the final output 118 can be a digital media item, e.g., a digital media item that includes one or more of audio, video, or image data. One example of a digital media item is an advertisement or other media item characterizing a product or service. Another example of a digital media item is a song or a video about a particular set of one or more entities. Another example of a digital media item is an image that depicts a particular set of one or more entities.

Generally, the generative neural network 110 is configured to process a conditioning input ("input prompt") to generate a data item. Generally, the data item represents a response to the conditioning input which may be, e.g., a "prompt" for the generative neural network. For example, the conditioning input can characterize one or more desired properties for the generated data item.

In some implementations the system 100 is adapted to run on parallel processing computer system that includes a plurality of hardware computing devices configured to operate in parallel. Each hardware computing device may include a neural network accelerator, i.e., specialized hardware that is used to accelerate neural network computations, such as a GPU (Graphics Processing Unit) or TPU (Tensor Processing Unit). In general, a neural network accelerator is configured to perform hardware matrix multiplications; it can include a set of one or more multiply accumulate units (MACs). For example, when generating the structured summaries 114 the system 100 can deploy multiple instances of the neural network 110 across multiple devices and use the instances to parallelize the generation of the structured summaries 114. As another example, when generating structured summaries of the first segment 112 and each of the additional segments 116, the system 100 can deploy multiple instances of the neural network 110 across multiple devices and use the instances to parallelize the generation of the structured summaries 112 and 114.

In some implementations the generative neural network 110 generates an output token sequence from an input token sequence including the conditioning input. The generative neural network 110 may then be configured to process the input token sequence to generate for each position in the output token sequence, a respective score for each token in a vocabulary of output tokens, that is used to select an output token for the output token sequence.

In some implementations the tokens can represent text, e.g., words, wordpieces or characters, in a natural or computer language. For example, text may be received, e.g., as a series of encoded characters, e.g., UTF-8 encoded characters; such "characters" can include Chinese and other similar characters, as well as logograms, syllabograms and the like. A text encoder, i.e., a tokenizer, can process a sequence of text to represent the text as a series of text tokens from a vocabulary of text tokens, e.g., that each represent words, wordpieces or characters in a natural or computer language. The computer language may be any formal language used to communicate with a computer, e.g., a markup language, or a command or configuration language, or a data exchange language such as JSON, or a programming language. The tokenizer can, e.g., implement BPE (Byte Pair Encoding) or Wordpiece tokenization. Optionally the text can be obtained from audio data representing speech; the output tokens may be converted into audio data that represent speech corresponding to the text.

Also, or instead, the tokens may represent an image. For example, a set (sequence) of input or output tokens can represent an image. Each image token may include a block encoding of values of the pixels in a different region of an image that maps a set of values of the pixels to a respective image token. The block encoder may include a neural network, e.g., having one or more (self-)attention layers, such as a Transformer neural network.

Also, or instead, the tokens may represent an audio waveform. For example, a set (sequence) of input or output tokens can represent audio data representing a waveform e.g., instantaneous audio amplitude values or time-frequency audio data. Each audio token may include a block encoding of the audio waveform in a different time segment of the audio that maps a set of values representing the audio waveform to a respective audio token. The block encoder may include a neural network, e.g., having one or more (self-) attention layers, such as a Transformer neural network.

In a multimodal input or output token sequence, audio data or an image may be flagged by a start-of-audio token or start-of-image token.

In some implementations, the generative neural network 110 is a diffusion model neural network. In general a diffusion model neural network can be a neural network that has been trained to process a diffusion input that includes a current noisy data item and data specifying a current time to generate a diffusion output that defines an estimate (given the current time) of either a noise component of the current noisy data item, i.e. an estimate of the noise that has been added to an original data item to generate the current noisy data item; or of a de-noised version of the current noisy data item.

In some implementations, the generative neural network 110 can be a multimodal network that is configured to process a conditioning input that includes one or more of text data, audio data defining an audio signal (e.g. as amplitude values of the audio signal or as a time-frequency representation of the audio signal), or a still or moving image (e.g. as image pixel values), to generate a data item that can similarly include text data, audio data, or a still or moving image.

For example, the conditioning input may include text and the data item may include an image or an audio signal that represents speech an image generated in response to the text, e.g., described by the text. Also, or instead, the conditioning input may include an audio signal that represents speech, or an image, and the data item may include text, e.g., that describes the conditioning input.

As another example, the conditioning input may include an observation, e.g., of a real-world environment, e.g., from sensor such as a camera or other image sensor; and optionally additional information such as information defining a particular task to be performed. The output data item may include agent control data that defines one or more actions to be performed by an agent, e.g., by a mechanical agent such as a robot or autonomous vehicle, to perform a task. The reward model(s) may, e.g., define a preferred trajectory of motion of the mechanical agent in the (real-world) environment.

In some implementations the generative neural network 110 may include a language and/or image generation neural network, that may have been previously trained (e.g., pre-trained by the system 100 or another system). The conditioning input may include a prompt, e.g., a natural or computer language prompt for the generative neural network 110. The generated data item may include a natural or computer language and/or image response to the prompt.

In general, the generative neural network 110 can have any appropriate architecture for processing the conditioning input to generate the data item.

As one example, the generative neural network 110 may include an auto-regressive generative model (e.g., a Transformer, a recurrent neural network, etc.) that can auto-regressively generate an output sequence as the data item based on the conditioning input. The generative model can, for example, include a language model (LM) that can auto-regressively generate tokenized representations of text data, a vision-language model (VLM) that can auto-regressively generate tokenized representations of image or video data, e.g. in response to a text conditioning input or that can auto-regressively generate tokenized representations of text, e.g. in response to an image conditioning input, an audio language model that can auto-regressively generate tokenized representations of text data, or a multimodal model that can that can generate tokens representing any of text, image or audio, e.g. in response to a conditioning input including any of text, image or audio, and so forth.

As another example, the generative neural network 110 may include a diffusion model (e.g., a denoising diffusion model, a score-based diffusion model, a latent diffusion model, etc.) that can generate the data item by repeatedly transforming samples from a noise distribution (e.g., a Gaussian distribution) based on the conditioning input over a sequence of iterations. For example, the generative neural network 110 may include a diffusion model that transforms samples from the noise distribution using a denoising neural network with any appropriate architecture (e.g., a convolutional neural network, a recurrent neural network, etc.). Such a diffusion model may be used to generate, e.g., a still or moving (video) image.

As another example, the generative neural network 110 may include a neural network that can generate the data item by transforming samples from a noise distribution (e.g., a Gaussian distribution). The generative neural network 110 may include, e.g., a generator network of a generative adversarial network, a decoder of a variational auto-encoder, a normalizing flow, and so on.

As used herein an image may be any still or moving image, i.e., the image may be part of a video, in 2D or 3D, and may be a monochrome, color or hyperspectral image, i.e., includes monochrome or color pixels. As defined herein an "image" includes a point cloud e.g., from a LIDAR system, and a "pixel" includes a point of the point cloud. An image may have been captured by a camera or other image sensor from the real world; and objects in the image may include physical objects, represented by the image.

In some implementations, the generative neural network 110, e.g., a language model or a visual language model, is stored on a user computing device, i.e., a device local to the user, such as a mobile device e.g., a mobile phone, or a smart speaker.

In some implementations the generative neural network 110 is implemented on a remote server in communication with a user computing device over a wired or wireless network communications link between the user computing device and the server.

The user computing device may be provided with an input mechanism, such as a text or voice interface, that enables user input from the user in a natural language. The user computing device may be provided with an output mechanism that provides a system output for the user in the or another natural language e.g., as speech or text; or in some other way, e.g., by displaying an image. The input and output mechanism may include, e.g., a keyboard, microphone, speaker, display, and/or camera.

As an example, the input mechanism may include a system configured to input audio data characterizing a speech waveform of speech representing the input from the user in a natural language, and configured to convert the audio data into tokens representing the speech in the natural language, e.g., representing a transcription of the spoken input. The output mechanism may include a system configured to receive tokens representing the output for the user in the or another natural language and a system configured to convert the received tokens into audio data representing a waveform of speech representing the output to the user in the natural language, i.e., representing spoken words.

As a further example, the trained system can be deployed in an environment that enables a user to provide a request for the system, e.g., to process a multimodal conditioning input to generate a corresponding data item output. A user can provide the request, e.g., by way of a user interface or through an application programming interface (API). The request can be transmitted from a user device, e.g., over a data communications network such as the internet, to one or more computers implementing the system, e.g., in a data center. The system can generate a data item and then transmit the data item to a user device over a data communications network.

The generative neural network 110 may include a multimodal machine learning system such as a visual language model (VLM). That is, implementations of the generative neural network can perform a multimodal task in which the conditioning input and data item, collectively, include data of multiple different types. As used herein text can include numbers, punctuation, special symbols, and so forth.

In some implementations, after training, a particular task that is to be performed by the generative neural network can be described by part or all of a sequence of text in the conditioning input to the system. For example, in a conditioning input that includes an image such a prompt might specify "Generate a caption", "Generate a description", "Answer the following question: [about the image or video] ", or "Detect a person". Where the system is used for an agent control task a prompt may define "Take the knife out of the drawer", or "Q: What action should the robot take to take the knife out of the drawer?". Also, or instead, such a prompt may give one or more examples of a task to be performed. The generative neural network 110 can be trained on multiple natural and/or computer languages and the prompt may then specify a language to use.

Figure 2:
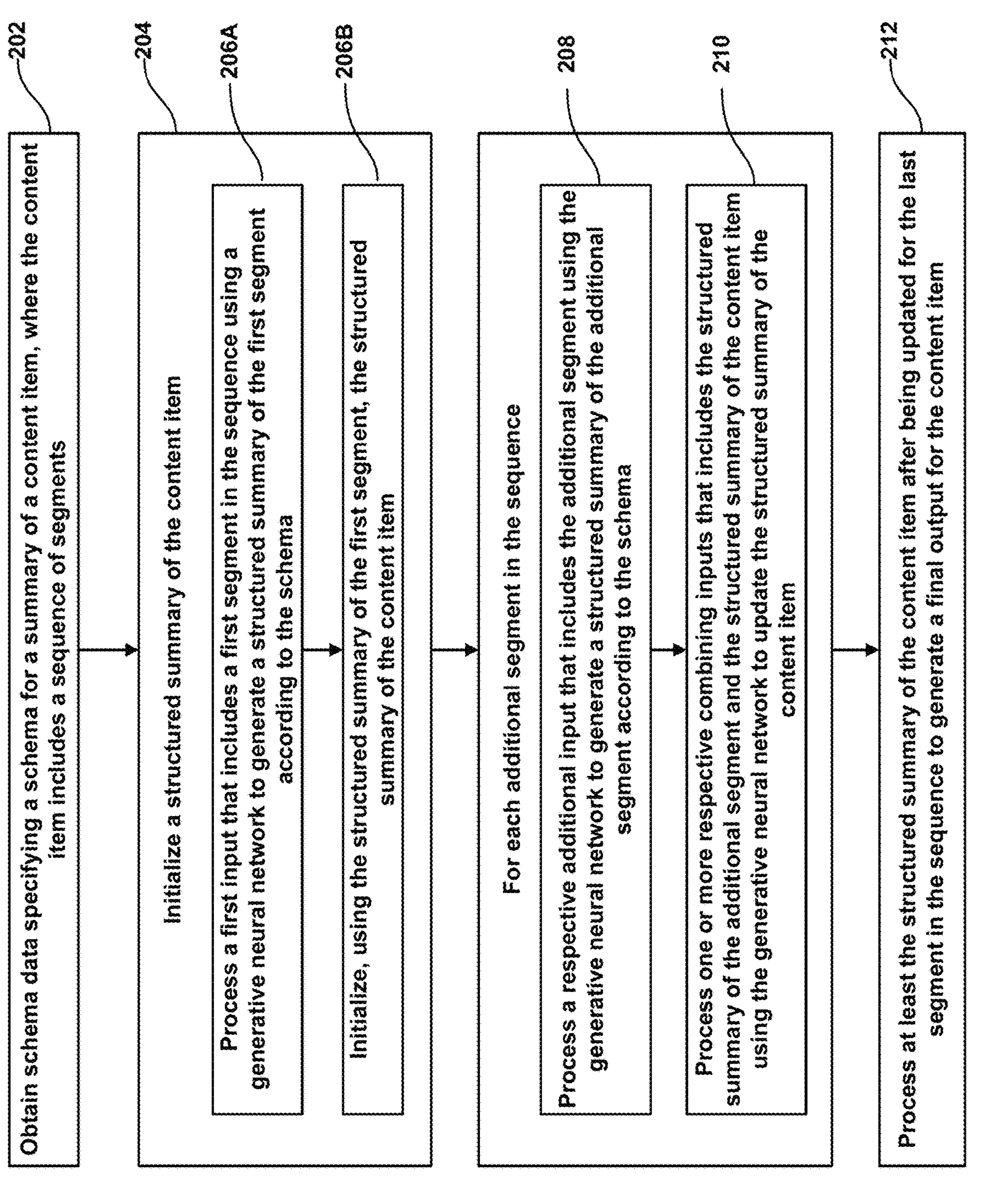
FIG. 2 is a flow diagram of an example process for generating a structured summary of a content item.

FIG. 2 is a flow diagram of an example process 200 for generating a structured summary of a content item. For convenience, the process 200 will be described as being performed by a system of one or more computers located in one or more locations. For example, an incremental summarization system, e.g., the incremental summarization system 100 of FIG. 1, appropriately programmed in accordance with this specification, can perform the process 200.

The system obtains schema data specifying a schema for a summary of a content item, where the content item includes a sequence of segments (step 202).

The content item can include any appropriate data type. For example, text, image(s), audio, video(s), an encoded representation of data that is a single embedding, an encoded representation of data that is a sequence of embeddings, any combination of these, and so on. But the content item must be able to be subdivided into a sequence of segments. For example, a content item can be a collection of documents and each segment is a respective document from the collection. As described above, the document can include any of a variety of modalities, such as text, image(s), video(s), audio, any combination of these, and so on.

In some implementations, the content item is a collection of documents relating to a particular set of one or more entities (e.g., people, places, organizations, and so on) and each segment is a respective document from the collection.

For example, the collection of documents can be a collection of paragraphs belonging to an article reviewing a smartphone (i.e., the smartphone is the entity); Each segment is a respective paragraph of the article.

As another example, the collection of documents can be a collection of chapters belonging to a biography book about a historical figure (i.e., the historical figure is the entity); Each segment is a respective chapter of the book.

As another example, the collection of documents can be a collection of video frames belonging to documentary video documenting a lion chasing a gazelle (i.e., the lion and gazelle are the entities); Each segment is a respective video frame of the video.

As described above, a content item can be from any data source. For example, the content item can be from webpages, books, videos, articles, audio recordings, camera image captures, provided by users, synthetically generated, any combination of these, and so on.

In some implementations, to identify the collection of documents relating to a particular set of one or more entities, the system obtains a search query relating to the particular set of one or more entities, provides the search query to an Internet search engine, and obtains, in response to the search query and from the Internet search engine, search results identifying the collection of documents.

For example, the system can obtain a search query from a user through an end-user device (e.g., desktop or laptop computer, tablet, smart phone, or other mobile device), provide the search query to an Internet search engine programmatically through a search engine API call, and obtain the search results from the API call identifying the collection of documents (e.g., most relevant webpages to the query).

As described above, a schema specifies the structure of a structured summary, and, generally, the schema specifies a set of keys that are related to the content item and, optionally, requirements for the respective values for each of the keys.

That is, in some implementations, the schema specifies a plurality of keys relating to the content item and each structured summary includes one or more respective values for each of one or more of the keys.

So, for example, for these implementations, the structured summary of the content item, the structured summary of the first segment of the content item, and the structured summaries of the one or more additional segments of the content item all include one or more respective values for each of one or more of the keys. For example, if the schema specified the keys "characters" and "motivation", then each structured summary includes the keys "characters" and "motivation" along with their respective value(s).

In some cases, the schema is a schema for a particular structured data format and each structured summary conforms to the particular structured data format.

So, for example, for these cases, the first segment of the content item, and the structured summaries of the one or more additional segments of the content item all conform to the particular structured data format. Generally, the particular structured data format can be any format (private or publicly used).

Further in some cases, the particular structured data format is JavaScript Object Notation (JSON), Yet Another Markup Language (YAML), or Extensible Markup Language (XML).

The schema data includes the information necessary to explicitly define the schema.

For example, for a summary of a content item in terms of an entity, the schema data can be represented as text and can define the schema to conform to a JSON standard such as:

Summary: {attributes: {name: str, values: list[str]}}.

The text sequence begins with "Summary:" (which indicates the text that follows defines the schema is to be used for summarizing) and the rest of the text represents the schema (and includes type requirements for the values of the keys). That is, the text representation of the schema defines a nested dictionary structure (of key-value pairs) where the values are either a dictionary object, a string, or a list of strings. That is, the schema data defines the schema to be a dictionary object with a top-level key of "attributes" and respective value that is another dictionary object. The other dictionary object has the top-level keys: "name" (which represents the name for an attribute) and the "values" (which represents the values corresponding to the named attribute). As a particular example, a structured summary of a content item for an entity (e.g., a hotel) that adheres to the defined schema of the schema data can be {attributes: {name: "Amenities", values:["cozy fire pits", "lacks outdoor entertainment options"]},
{name: "Atmosphere", values:["Panoramic vistas from room", "festive decorations"]}
}

As another example, for a summary of book context, the schema data can be represented as text and can define a schema as Summary: {
characters: {name: str, explanations: list[str]},
events: {name: str, explanations: list[str]},
background: {name: str, explanations: list[str]},
motivations: {name: str, explanations: list[str]},
objectives: {name: str, explanations: list[str]},
other: {name: str, explanations: list[str]}} where the top level keys of the dictionary are "characters", "events", "background", "motivations", "objectives", and "other". Each of the top-level keys is associated with a dictionary object that is further defined by keys and key requirements.

As another example, for the summary of an entity, the schema data can be represented as programming language text (e.g., Python programming language text). For example:

class Summary(TypedDict):
attributes: dict[str, list[str]]

defines a user defined python class (called "Summary") that is a derived class of the Python TypedDict class and represents the structure of a summary. A 'Summary' dictionary object has a single key ("attributes") with a value that is a nested dictionary. That nested dictionary is defined to have string type keys with a respective 'list[str]' (i.e., a list of strings) type values. This example schema data represents a schema that is the Python language equivalent to the above {attributes: {name: str, values: list[str]}} JSON type.

The system initializes a structured summary of the content item (step 204), and, as part of step 204, the system performs steps 206A-206B.

That is, the system processes a first input that includes a first segment in the sequence using a generative neural network to generate a structured summary of the first segment according to the schema (step 206A).

As described above, the generative neural network can have any of a variety of neural network architectures. For example, the generative neural network can have any appropriate architecture in any appropriate configuration that can process a conditioning input (i.e., "input prompt") to generate a data item (i.e., a response to the input prompt), including fully connected layers, convolutional layers, recurrent layers, attention-based layers, and so on, as is appropriate.

In particular, in some cases, the generative neural network is an auto-regressive token generation neural network, and, further in some cases, the generative neural network includes one or more self-attention layers. For example, the generative neural network can belong to the Gemini, Gemma, or PaLM 2 family of neural networks.

So, for example, if the content item is a text article review of a hotel for which the sequence of segments are paragraphs of the article and the schema is a JSON table, the system can use the generative neural network (e.g., an auto-regressive language model that includes one or more attention layers) to process the first input that includes a first segment (i.e., process the first input that includes the first paragraph and optionally an input prompt as an input token sequence) to generate a structured summary of the first segment according to the schema (e.g., generate and detokenize an output token sequence that represents the structured summary of the first segment according to the schema).

Given the above example, an example of the first input used to generate a structured summary of the first segment according to the schema can be:

Your Task:
Generate a JSON table based on the following paragraph of the specified entity.
Entity:
{entity_name}
Paragraph:
{paragraph 1}
Proceed to generate the summary Json.

where {paragraph 1} represents the first segment and the surrounding text represents the prompt that includes instructions to generate the structured summary of the first segment according to the JSON schema (i.e., "Generate a JSON table . . . Proceed to generate the summary Json").

Although, for the above example, {paragraph 1} is text because the documents are paragraphs of text article, the document can easily have taken the form of text, image(s), video(s), or any combination of these for appropriate content items.

For example, if the content item were a review article for the hotel that included images, then {paragraph 1} can be text and inline images included in the text (e.g., a paragraph describing an outdoor pool the guest of the hotel can use may include an image of that pool).

As another example, if the content item were a website for the hotel, where the documents are webpages of the website that includes text along with embedded media such as video clips, images, audio, then {paragraph 1} can instead be the webpage that includes text, image(s), video(s), and audio. For example, a webpage can be listing the amenities of the hotel and include images and videos with sound of guest using the amenities.

In some cases, when the first input includes a prompt, that prompt can in turn incorporate one or more prompting techniques, e.g., zero-shot prompting, few-shot prompting, chain-of-thought prompting, role prompting, instruction prompting, rewriting or refining prompts, output constraints, self-consistency prompting, tool-use prompting, contextual priming, and so on.

In some cases, the first input includes the first segment and the schema data.

For example, given the above example first input, the first input can further include the above example schema data represented as a programming language text for a Python class definition so that the first input can be:

Your Task:
Generate a JSON table according to the class definition [CLASS], which defines some fields that need to be generated, based on the following paragraph of the specified entity.

Entity:

{entity_name}

[CLASS]

class Summary(TypedDict):

attributes: dict[str, list[str]] # Keyed by attribute, with a list of sufficient details about the attribute.

Paragraph:

{paragraph 1}

Proceed to generate the summary Json.

where the text directly below [CLASS] is the schema data and serves to guide the output sequence generation to produces a correctly formatted structured summary of the first segment.

After step 206A, the system initializes, using the structured summary of the first segment, the structured summary of the content item (step 206B).

For example, the system can initialize the structured summary of the content item to be the structured summary of the first segment.

In some cases, the system processes the structured summary of the first segment to determine if the structured summary of the first segment is in accordance with the schema. Then, in response to determining the structured summary of the first segment is in accordance with the schema, the system initializes the structured summary of the content item to be the structured summary of the first segment.

For example, the system can process the structured summary of the first segment using the generative neural network to determine if the structured summary of the first segment is in accordance with the schema (e.g., the system can use the generative neural network to process the structured summary of the first segment and schema data to generate a binary output that represents "in accordance with the schema" or "not in accordance with the schema"). Then, in response to determining the structured summary of the first segment is in accordance with the schema (e.g., determining that the generated binary output is "in accordance with the schema"), the system can initialize the structured summary of the content item to be the structured summary of the first segment.

For each additional segment in the sequence, the system performs steps 208-210.

The system processes a respective additional input that includes the additional segment using the generative neural network to generate a structured summary of the additional segment according to the schema (step 208).

As described above, the additional segments are the other segments (after the first segment) in the sequence of one or more segments of the content item.

So, for example, if the content item is a text article review of a hotel for which the sequence of segments are paragraphs of the article and the schema is a JSON table, the system can use the generative neural network (e.g., an auto-regressive language model that includes one or more attention layers) to process the additional input that includes an additional segment (e.g., for the second segment, process the additional input that includes the second paragraph and optionally an input prompt as an input token sequence) to generate a structured summary of the additional segment according to the schema (e.g., generate and detokenize an output token sequence that represents the structured summary of the additional segment according to the schema).

So, an example additional input can be:

Your Task:

Generate a JSON table based on the following paragraph of the specified entity.

Entity:

{entity_name}

Paragraph:

{paragraph 2}

Proceed to generate the summary Json.

where the additional segment is represented as {paragraph 2} (i.e., the second segment of a sequence of segments of the content item).

In some implementations, the respective additional input includes the additional segment and the schema data. That is, the system processes the schema data along (with the additional segment) which causes the generative neural network to generate a structured summary of the additional segment that conforms to the schema defined by the schema data.

For example, when the system uses a generative neural network configured to process an input token sequence to generate an output token sequence, the additional input can include schema data, and the system can use the generative neural network to tokenize the schema data (to be part of the input token sequence) and process it to guide the generation of the structured summary of the additional segment.

As a particular example, building on the above example additional input, the additional input can be:

Your Task:

Generate a JSON table according to the class definition [CLASS], which defines some fields that need to be generated, based on the following paragraph of the specified entity.

Entity:

{entity_name}

[CLASS]

class Summary(TypedDict):

attributes: dict[str, list[str]] # Keyed by attribute, with a list of sufficient details about the attribute.

Paragraph:

{paragraph 2}

Proceed to generate the summary Json.

where {paragraph 2} is the additional segment, the text directly below [CLASS] is the programming language text representation of the schema data and serves to guide the output sequence generation to produce a correctly formatted structured summary of the additional segment, and all other text represents a prompt (which can incorporate one or more prompting techniques, e.g., zero-shot prompting, few-shot prompting, chain-of-thought prompting, role prompting, instruction prompting, rewriting or refining prompts, output constraints, self-consistency prompting, tool-use prompting, contextual priming, and so on).

The system processes one or more respective combining inputs that includes the structured summary of the additional segment and the structured summary of the content item using the generative neural network to update the structured summary of the content item (step 210).

The one or more respective combining inputs for the additional segment include the information that the updated structured summary of the content item will include. That is, the structured summary of the additional segment includes new, additional, or updated information relevant to the content item. In addition, the structured summary of the content item includes current information relevant to the content item. So, by processing combining input(s) that include both the structured summary of the additional segment and the structured summary of the content item, the system can determine new, additional, or updated information relevant to the content item to update the structured summary of the content item.

In some implementations, the respective one or more combining inputs include the structured summary of the additional segment and the structured summary of the content item and the schema data. For these implementations, the inclusion of the schema data helps ensure that the system updates the structured summary of the content item in a way that adheres to the schema defined by the schema data.

In some cases, as part of step 210, the system process a first combining input that includes the (i) the structured summary of the additional segment, (ii) the structured summary of the content item, and (iii) a first prompt that instructs the generative neural network to identify whether any keys in the structured summary of the content item need to be updated given the structured summary of the additional segment using the generative neural network to generate an update output that defines an update to the structured summary of the content item.

Further in some cases, the first prompt instructs the generative neural network to sequentially (i) identify the keys in the structured summary of the content item, (ii) identify any relevant keys in the structured summary of the additional segment, and (iii) generate an update output using values for the relevant keys in the structured summary of the additional segment.

For example, the first combining input can include:

Your task is to propose updates to [PARTIAL SUMMARY] gathered from the information in [NEW SUMMARY].

There are two types of revisions that you can suggest: ADD and UPDATE.

For UPDATE, follow these instructions:

1. Your proposed updates must be for valid JSONPaths that already exist in [PARTIAL SUMMARY]. If the JSONPath does not exist, you should not propose an update for that JSONPath.
2. Updates can be made by modifying an existing value using content from [NEW SUMMARY].
3. Updates should never reduce the amount of information in [PARTIAL SUMMARY].
4. Never remove existing information from the [PARTIAL SUMMARY].
5. Proposed update must be a 'dict[str, ProposedUpdate]' where the key is a valid JSONPath in [CLASS] and 'ProposedUpdate' is defined as follows:

‘‘‘ class ProposedUpdate(TypedDict):

update: Any # The type must be the same type as at the JSONPath in [CLASS].

‘‘‘ where [NEW SUMMARY] is a reference to the structured summary of the additional segment, [PARTIAL SUMMARY] is a reference to the structured summary of the content item, and the remaining text is an example of the first prompt. This example first prompt begins with an instruction to generate an update output which is followed by five enumerated instructions of how to update the structured summary of the content item by identifying whether any keys in the structured summary of the content item need to be updated given the identified relevant keys of the structured summary of the additional segment.

An update output is any type of output that defines how to update the structured summary of the content item. In some cases, the update output specifies a query in the particular data exchange format.

For example, given the above example first prompt, the update output is defined by the programming language text ProposedUpdate" Python class definition. Therefore, a particular example of the updated output can be:

{"$.'attributes'.'Amenities'": {"update": ["pub opens till midnight"]}} where the update object is a dictionary object (as defined by the ProposedUpdate class), the key "$.'attributes'.'Amenities'" of the dictionary object is a string representation that specifies a query in the particular data exchange format (i.e., a JSON path included in the structured summary of content item) and the nested dictionary with the top level key "update" has a corresponding value that is a string "pub opens till midnight" that constitutes the update. Therefore, this example update output defines the update to a summary of a hotel to have 'attributes'.'Amenities' to include "pub opens till midnight".

Update outputs that specify a query in the particular data exchange format are particularly efficient for updating a structured summary because the defined structure of both the query and the structured summary make relevant fields more prominent (due to less variable and fewer surrounding content around the relevant field) and, therefore, easier for generative neural network to process than an unstructured format or update output. For example, given a generative neural network that can perform an attention mechanism, the relevant fields of the update output and the structured summary will be easier to attend to because the structured nature provides clear patterns to identify the relevant portions (e.g., dictionary key-value structures makes identifying a key and respective value straightforward).

In some implementations, as part of step 210, the system processes a second combining input that includes the (i) the structured summary of the additional segment, (ii) the structured summary of the content item, and (iii) a second prompt that instructs the generative neural network to identify whether any keys from the structured summary of the additional segment need to be added as new keys to the structured summary of the content item using the generative neural network to generate an update output that defines an update to the structured summary of the content item.

Further in some of these implementations, the second prompt instructs the generative neural network to sequentially (i) identify the keys in the structured summary of the additional segment, (ii) identify any keys in the structured summary of the additional segment that are not in the structured summary of the content item, and (iii) generate an update output from the identified keys in the structured summary of the additional segment.

For example, the second combining input can include:

Your task is to propose updates to [PARTIAL SUMMARY] gathered from the information in [NEW SUMMARY].

There are two types of revisions that you can suggest: ADD and UPDATE.

For ADD, follow these instructions:

1. Proposed additions must be for valid JSONPaths that adhere to the definition in [CLASS]. They are allowed to increase the size of lists in the definition, but they must not define new fields which are not defined in the class definition.
2. It is OK to add partial objects. Leave fields unset if [NEW SUMMARY] does not contain a value for one of the fields in [PARTIAL SUMMARY].

3. Proposed additions must be a 'dict[str, ProposedAdd]' where the key is a valid JSONPath in [CLASS] and 'ProposedAdd' is defined as follows:

```
class ProposedAdd(TypedDict):
add: Any # The type must be the same type as at the
  JSONPath in [CLASS].
```

where [NEW SUMMARY] is a reference to the structured summary of the additional segment, [PARTIAL SUMMARY] is a reference to the structured summary of the content item, and the remaining text is an example of the second prompt. This example second prompt beings with an instruction to generate an update output which is followed by three enumerated instructions of how identify keys that are in the structured summary of the additional segment but not in the set of keys for the structured summary of the content item and generated 'additions'.

Given the above example second prompt, the update output is defined by the programming language text ProposedAdd" Python class definition. Therefore, a particular example of the updated output can be:

{"$.'attributes'.'Noise Level'": {"add": ["Notable street noise at night"]},} where the update object is a dictionary object (as defined by the ProposedAdd class), the key "$.'attributes'.'Noise Level'" of the dictionary object is a string representation that specifies a query in the particular data exchange format (i.e., a JSON path not yet included in the structured summary of content item) and the nested dictionary with the top level key "add" has a corresponding value that is a string "Notable street noise at night" that constitutes the addition. Therefore, this example update output defines the addition to a summary of a hotel to have 'attributes'.'Noise Level' to include "Notable street noise at night".

The system processes at least the structured summary of the content item after being updated for the last segment in the sequence to generate a final output for the content item (step 212).

For example, the system can use the generative neural network to process at least the structured summary of the content item after being updated for the last segment in the sequence to generate a final output for the content item. Further details are described below.

In some implementations, the system sets the final output for the content item to be the structured summary of the content item after being updated for the last segment in the sequence.

In some implementations, as part of step 212, the system uses the generative neural network to process an input that includes at least the structured summary of the content item after being updated for the last segment in the sequence to generate a final summary of the content item.

For example, the system can use a generative neural network that is an auto-regressive language model that includes one or more attention layers to process an input that includes at least the structured summary of the content item after being updated for the last segment in the sequence (and optionally an input prompt) as an input token sequence (after tokenization) to generate an output token sequence that represents a final summary.

In some implementations, after the system generates the final summary, the system can set the final output for the content item to be the final summary.

In some cases, the final summary is a structured summary in accordance with the schema. That is, the final summary organizes the most essential information of the content item according to the schema defined by the schema data. So, if the schema requires particular keys and, optionally, particular requirements for values for the respective keys, the final summary adheres to these requirements.

For example, given the above example of the system processing the input using an auto-regressive language model, the input for the language model can include instructions to generate the final summary in accordance with the schema. For example, for a JSON schema, the input can include the following text instructions:

Structure of the JSON Summary:

Fields to Generate: Characters, Events, Backgrounds, Motivations, Objectives, Other.

Field Format: Each field should be a dictionary where keys are the names of elements and values are their short descriptions.

Each key should include a short and concise information as values that explain the key.

Content Focus: Values should highlight the most important information relevant to the main story.

Do not include trivial information or redundant information as a value for its corresponding key.

In other cases, the final summary is a natural language summary. That is, the final summary organizes the most essential information into human readable prose.

For example, given the above example of the system processing the input using an auto-regressive language model, the input for the language model can include instructions to generate the final summary as a natural language summary. For example, the input can include the following text instructions:

Structure of the Text Summary:

Key Elements to Include: Incorporate key events, characters, backgrounds, motivations, objectives, and other relevant details.

Narrative Flow: Ensure the summary flows seamlessly as a cohesive and comprehensive narrative.

In some cases, when the content item is a collection of documents relating to a particular set of one or more entities (optionally, identified through a search result, e.g., as described above), and each segment of the content item is a respective document from the collection, the final output is a summary of the collection of documents. For example, the summary of the collection of documents can be a natural language summary, e.g., a prose style summarization of the one or more entities present in the documents.

As a particular example, given a content item that is a video tour of a hotel organized as a collection of documents, where each document is a collection of sequential video frames, the last updated structured summary of the content item can include attributes of the entity (i.e., attributes of the hotel). So, the system can use, e.g., an auto-regressive language model that tokenizes inputs, to generate a final output that is an output token sequence representation of a natural language summary specifying the attributes of the hotel. That is, the system can process an input for step 212 that includes at least the structured summary of the content item after being updated for the last segment in the sequence, and includes instructions to generate an output token sequence that represents the final summary as a natural language summary based on the attributes present in the last updated structured summary of the content item, to generate the final output as an output token sequence representation of a natural language summary specifying the attributes of the hotel.

In some cases, when the content item is a collection of documents relating to a particular set of one or more entities (optionally, identified through a search result, e.g., as described above), and each segment of the content item is a respective document from the collection, the final output is a digital media item characterizing the particular set of one or more entities and the digital media item can include audio data, image data, or video data.

For example, given a content item that is a collection of documents identified from a search result (e.g., webpages related to keywords for shoes), the last updated structured summary of the content item can include attributes of the entity (i.e., attributes of the shoe, e.g., shoe brand, shoe type, shoe size, shoe color, and so on). So, the system can use, e.g., an auto-regressive language model that tokenizes inputs, to process an input for step 212 as an input token sequence that includes at least the structured summary of the content item after being updated for the last segment in the sequence and includes instructions to generate a digital media item, to generate an output token sequence that represents the digital media item (where the output tokens can represent text, pixels, audio data, and so on).

The instructions included in the input above can be to generate, e.g., a digital media item that is an advertisement (e.g., a still image advertisement, video advertisement, audio advertisement, and so on) based on the attributes present in the last updated structured summary of the content item.

The instructions included in the input above can be to generate, e.g., a digital media item that is a song or a video about the particular set of one or more entities based on the attributes present in the last updated structured summary of the content item.

The instructions included in the input above can be to generate, e.g., a digital media item that is an image that depicts a particular set of one or more entities based on the attributes present in the last updated structured summary of the content item.

In some cases, the system (or another system) can use the final output as part of a downstream task. That is, the system can generate a final output, e.g., as described above using the generative neural network, and the final output can be, e.g., a structured summary or natural language summary. Then the system (or another system) can further process the final output to perform a downstream task, where the downstream task can be any of a variety of task types. In some cases, the system uses the generative neural network to process the final output, but, in other cases, the system uses another neural network.

For example, the downstream task can be a classification task. As a particular example, the content item can be a book, and the final output for the content item can be a structured summary (or natural language summary) of the book that includes information relevant to the book's plot, characters, themes, and so on; the downstream task can be for the system (or another system) to use a classification neural network to process the final output to classify what genre the book belongs to (e.g., fiction, non-fiction, mystery, and so on).

As another example, the downstream task can be a "question and answering task" (i.e., generating answer to questions based on the final output). As a particular example, the content item can be a mystery book, and the final output for the content item can be a structured summary (or natural language summary) of the book; the system (or another system) can perform the "question and answering" task to provide a natural language answer to the natural language question "What clues did the detective discover that led them to solve the mystery?" by using an auto-regressive language model neural network to process the final output as an input token sequence to generate an output token sequence that represents the natural language response to the question. In some cases, the language model neural network the system uses to generate the natural language answer is the same generative neural network the system used to generate the updated structured summary of the content item.

As another example, the downstream task can be to control an agent. For example, the system (or another system) can use a policy neural network to process a final output to select an action for a real-world mechanical agent to perform in the real-world environment. As a particular example, the final output can be structured summary (or natural language summary) of a content item that is a temporal sequence of 360 images of the environment that includes entities taken from camera placed on top of the mechanical agent. The system (or another system) can process the final output using a policy neural network to determine scores for actions, then select the action with the highest score, and then provide the action to the mechanical agent to perform.

FIG. 3 is an example 300 of the performance of the described techniques.

In particular, example 300 shows a table that summarizes the performance of the described techniques evaluated on the task of generating a summary of an entity of the content item, where the content item is a collection of documents and where each document is a text paragraph.

The rows denoted as GO refers to using a generative neural network to process the content item all at once to generate a final summary. $GO_{text}$ denotes the case that the final summary is a text summary, and $GO_{JSON}$ denotes the case that the final summary is a structured summary in accordance with the JSON format.

The rows denoted as GU refers to using a generative neural network to iteratively update the final summary for each document without using combining inputs that include instructions to update/add to the summary based on summaries for each document). $GU_{text}$ denotes the case that the final summary is a text summary, and $GU_{JSON}$ denotes the case that the final summary is a structured summary in accordance with the JSON format.

The row denoted as $GM_{JSON}$ refers to using a generative neural network to generate summaries for each document and then merging these summaries to remove duplicated information and create a final structured summary in accordance with the JSON format.

The row denoted as $CoK_{JSON}$ refers to an example the described techniques, where a generative neural network iteratively updates a structured summary of the content item in accordance with the JSON format and does use combining inputs that include instructions to update/add entries to the structured summary of the content item.

The column label "Turn" denotes the performance at a particular segment of the content item (i.e., "start" refers to at the first segment, "last" refers to at the last segment) or average over all segments of the content item.

The column label "Ultra" or "Pro" refers to the use of the generative neural network Gemini Ultra or Gemini Pro.

The column labels "P", "R", "F1" refer to the average precision, average recall, and macro F1 scores, respectively of attribute-value pairs related to a specific entity.

Example 300 shows that almost universally across different uses of generative neural networks (Ultra or Pro) and metrics (i.e., P, R, and F1) the most complete use of the described techniques (i.e., $CoK_{JSON}$) performs best. Example 300 shows that using structured summaries instead of text based summaries increases the perform of all methods.

Also, example 300 shows a notable decrease in recall for the GM method. This is more pronounced in the Ultra model, which removes more key-value pairs than the Pro model, leading to lower recall. In contrast, the CoK approach enhances both precision and recall across turns in both models, improving the F1 score by 3% in the final turn. This improvement suggests that CoK's step-by-step processing allows the model to more accurately select and update information, maintaining relevance as iterations progress.

FIG. 4 is an example 400 of the performance of the described techniques.

In particular, example 400 shows a table that summarizes the performance of the described techniques generating comprehensive summaries of books, where the $GU_{text}$, $GU_{json}$, $GM_{json}$, $CoK_{json}$ are defined as they were above for example 300 of FIG. 3.

The performance metric is computed using a language model (LM) evaluation metric that assesses summary coherence based on 8 predefined error dimensions (entity omission, event omission, causal omission, discontinuity, salience, language, inconsistency, duplication). Each error measures the following aspects: To evaluate the summary, each sentence is broken down into individual sentences and given to an LM evaluator along with the original summary. The evaluation prompt includes multiple examples for each error dimension, and the LM is asked to determine whether any errors are present in the current sentence and summary. If any errors are found, the sentence is marked as a "confusing sentence". The final score (illustrated in the table 400 for each method) is calculated by dividing the total number of confusing sentences identified by the LM by the total number of sentences in the summary.

Example 400 shows that CoK performs best followed by $GU_{json}$, which suggests that the structured format of the JSON format, supports better information retention. In particular, $GU_{json}$ posts a 14% gain, enhancing the generative neural network's ability to maintain key details about characters and events in the books. CoK shows 3% and 4% improvements in book scores over GM and GU. This indicates CoK's effectiveness in preserving detailed explanations of complex entities and events within books, crucial for the narrative.

Figure 5:
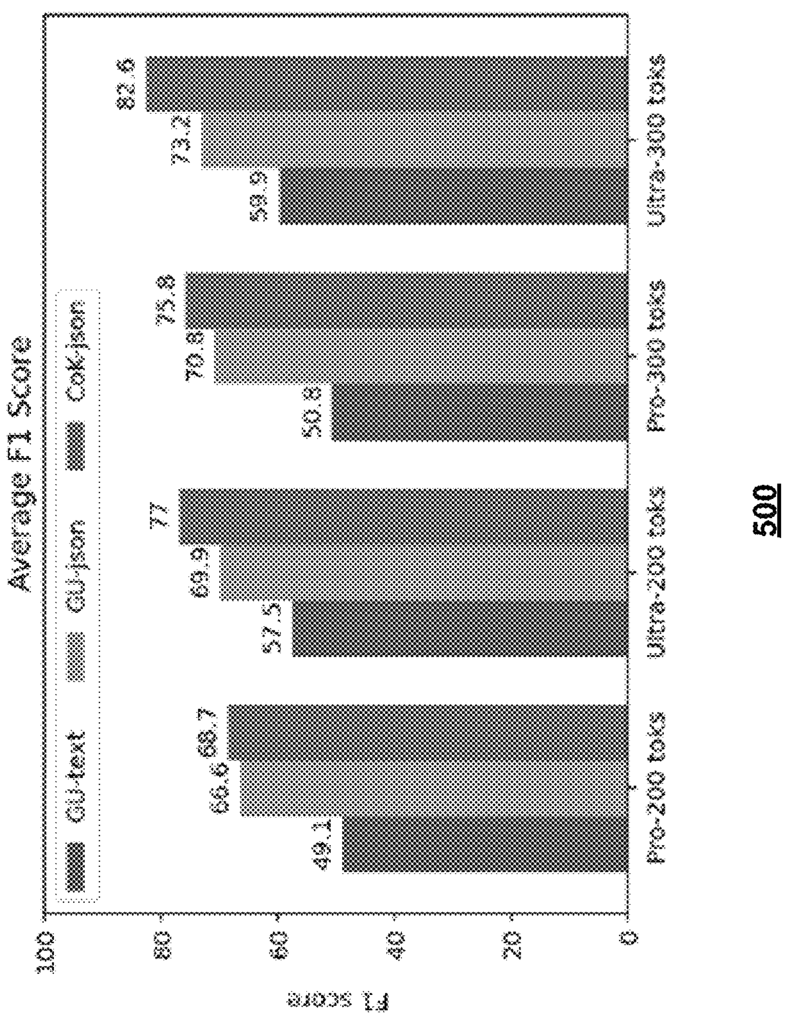
FIG. 5 is an example of the performance of the described techniques.

FIG. 5 is an example 500 of the performance of the described techniques.

In particular, example 500 shows a plot that summarizes the F1 performance metric score for the described techniques, where the x-axis refers to generative neural network used (either Gemini Pro or Gemini Ultra) and the fixed sized context window size in terms of number of tokens (either 200, or 300 tokens). Additionally, $GU_{text}$, $GU_{json}$, $GM_{json}$, $CoK_{json}$, and F1 are defined as they were above for example 300 of FIG. 3 and are applied to the same evaluation dataset.

Example 500 shows that improved performance of the described techniques does not come at the cost of an increase context window size. In particular, both the average F1 scores and the number of tokens used as existing information are tracked across all segments when token size is limited. The $GU_{json}$ method substantially surpasses baseline methods even with restricted token counts, achieving a 30% average F1 score improvement over textual counterparts. CoK shows an extra 8% F1 score improvement, suggesting that the use of the structured format (i.e., JSON format) maintains more precise and distinct information in summaries.

In this specification, the term "configured" is used in relation to computing systems and environments, as well as computer program components. A computing system or environment is considered "configured" to perform specific operations or actions when it possesses the necessary software, firmware, hardware, or a combination thereof, enabling it to carry out those operations or actions during operation. For instance, configuring a system might involve installing a software library with specific algorithms, updating firmware with new instructions for handling data, or adding a hardware component for enhanced processing capabilities. Similarly, one or more computer programs are "configured" to perform particular operations or actions when they contain instructions that, upon execution by a computing device or hardware, cause the device to perform those intended operations or actions.

The embodiments and functional operations described in this specification can be implemented in various forms, including digital electronic circuitry, software, firmware, computer hardware (encompassing the disclosed structures and their structural equivalents), or any combination thereof. The subject matter can be realized as one or more computer programs, essentially modules of computer program instructions encoded on a tangible non-transitory storage medium for execution by or to control the operation of a computing device or hardware. The storage medium can be a storage device such as a hard drive or solid-state drive (SSD), a storage medium, a random or serial access memory device, or a combination of these. Additionally or alternatively, the program instructions can be encoded on a transmitted signal, such as a machine-generated electrical, optical, or electromagnetic signal, designed to carry information for transmission to a receiving device or system for execution by a computing device or hardware. Furthermore, implementations may leverage emerging technologies like quantum computing or neuromorphic computing for specific applications, and may be deployed in distributed or cloud-based environments where components reside on different machines or within a cloud infrastructure.

The term "computing device or hardware" refers to the physical components involved in data processing and encompasses all types of devices and machines used for this purpose. Examples include processors or processing units, computers, multiple processors or computers working together, graphics processing units (GPUs), tensor processing units (TPUs), and specialized processing hardware such as field-programmable gate arrays (FPGAs) or application-specific integrated circuits (ASICs). In addition to hardware, a computing device or hardware may also include code that creates an execution environment for computer programs. This code can take the form of processor firmware, a protocol stack, a database management system, an operating system, or a combination of these elements. Embodiments may particularly benefit from utilizing the parallel processing capabilities of GPUs, in a General-Purpose computing on Graphics Processing Units (GPGPU) context, where code specifically designed for GPU execution, often called kernels or shaders, is employed. Similarly, TPUs excel at running optimized tensor operations crucial for many machine learning algorithms. By leveraging these accelerators and their specialized programming models, the system can achieve significant speedups and efficiency gains for tasks involving artificial intelligence and machine learning, particularly in areas such as computer vision, natural language processing, and robotics.

A computer program, also referred to as software, an application, a module, a script, code, or simply a program, can be written in any programming language, including compiled or interpreted languages, and declarative or procedural languages. It can be deployed in various forms, such as a standalone program, a module, a component, a subroutine, or any other unit suitable for use within a computing environment. A program may or may not correspond to a single file in a file system and can be stored in various ways. This includes being embedded within a file containing other programs or data (e.g., scripts within a markup language document), residing in a dedicated file, or distributed across multiple coordinated files (e.g., files storing modules, subprograms, or code segments). A computer program can be executed on a single computer or across multiple computers, whether located at a single site or distributed across multiple sites and interconnected through a data communication network. The specific implementation of the computer programs may involve a combination of traditional programming languages and specialized languages or libraries designed for GPGPU programming or TPU utilization, depending on the chosen hardware platform and desired performance characteristics.

In this specification, the term "engine" broadly refers to a software-based system, subsystem, or process designed to perform one or more specific functions. An engine is typically implemented as one or more software modules or components installed on one or more computers, which can be located at a single site or distributed across multiple locations. In some instances, one or more dedicated computers may be used for a particular engine, while in other cases, multiple engines may operate concurrently on the same one or more computers. Examples of engine functions within the context of AI and machine learning could include data pre-processing and cleaning, feature engineering and extraction, model training and optimization, inference and prediction generation, and post-processing of results. The specific design and implementation of engines will depend on the overall architecture and the distribution of computational tasks across various hardware components, including CPUs, GPUs, TPUs, and other specialized processors.

The processes and logic flows described in this specification can be executed by one or more programmable computers running one or more computer programs to perform functions by operating on input data and generating output. Additionally, graphics processing units (GPUs) and tensor processing units (TPUs) can be utilized to enable concurrent execution of aspects of these processes and logic flows, significantly accelerating performance. This approach offers significant advantages for computationally intensive tasks often found in AI and machine learning applications, such as matrix multiplications, convolutions, and other operations that exhibit a high degree of parallelism. By leveraging the parallel processing capabilities of GPUs and TPUs, significant speedups and efficiency gains compared to relying solely on CPUs can be achieved. Alternatively or in combination with programmable computers and specialized processors, these processes and logic flows can also be implemented using specialized processing hardware, such as field-programmable gate arrays (FPGAs) or application-specific integrated circuits (ASICs), for even greater performance or energy efficiency in specific use cases.

Computers capable of executing a computer program can be based on general-purpose microprocessors, special-purpose microprocessors, or a combination of both. They can also utilize any other type of central processing unit (CPU). Additionally, graphics processing units (GPUs), tensor processing units (TPUs), and other machine learning accelerators can be employed to enhance performance, particularly for tasks involving artificial intelligence and machine learning. These accelerators often work in conjunction with CPUs, handling specialized computations while the CPU manages overall system operations and other tasks. Typically, a CPU receives instructions and data from read-only memory (ROM), random access memory (RAM), or both. The elements of a computer include a CPU for executing instructions and one or more memory devices for storing instructions and data. The specific configuration of processing units and memory will depend on factors like the complexity of the AI model, the volume of data being processed, and the desired performance and latency requirements. Embodiments can be implemented on a wide range of computing platforms, from small, embedded devices with limited resources to large-scale data center systems with high-performance computing capabilities. The system may include storage devices like hard drives, SSDs, or flash memory for persistent data storage.

Computer-readable media suitable for storing computer program instructions and data encompass all forms of non-volatile memory, media, and memory devices. Examples include semiconductor memory devices such as read-only memory (ROM), solid-state drives (SSDs), and flash memory devices; hard disk drives (HDDs); optical media; and optical discs such as CDs, DVDs, and Blu-ray discs. The specific type of computer-readable media used will depend on factors such as the size of the data, access speed requirements, cost considerations, and the desired level of portability or permanence.

To facilitate user interaction, embodiments of the subject matter described in this specification can be implemented on a computing device equipped with a display device, such as a liquid crystal display (LCD) or an organic light-emitting diode (OLED) display, for presenting information to the user. Input can be provided by the user through various means, including a keyboard), touchscreens, voice commands, gesture recognition, or other input modalities depending on the specific device and application. Additional input methods can include acoustic, speech, or tactile input, while feedback to the user can take the form of visual, auditory, or tactile feedback. Furthermore, computers can interact with users by exchanging documents with a user's device or application. This can involve sending web content or data in response to requests or sending and receiving text messages or other forms of messages through mobile devices or messaging platforms. The selection of input and output modalities will depend on the specific application and the desired form of user interaction.

Machine learning models can be implemented and deployed using machine learning frameworks, such as TensorFlow or JAX. These frameworks offer comprehensive tools and libraries that facilitate the development, training, and deployment of machine learning models.

Embodiments of the subject matter described in this specification can be implemented within a computing system comprising one or more components, depending on the specific application and requirements. These may include a back-end component, such as a back-end server or cloud-based infrastructure; an optional middleware component, such as a middleware server or application programming interface (API), to facilitate communication and data exchange; and a front-end component, such as a client device with a user interface, a web browser, or an app, through which a user can interact with the implemented subject matter. For instance, the described functionality could be implemented solely on a client device (e.g., for on-device machine learning) or deployed as a combination of front-end and back-end components for more complex applications. These components, when present, can be interconnected using any form or medium of digital data communication, such as a communication network like a local area network (LAN) or a wide area network (WAN) including the Internet. The specific system architecture and choice of components will depend on factors such as the scale of the application, the need for real-time processing, data security requirements, and the desired user experience.

The computing system can include clients and servers that may be geographically separated and interact through a communication network. The specific type of network, such as a local area network (LAN), a wide area network (WAN), or the Internet, will depend on the reach and scale of the application. The client-server relationship is established through computer programs running on the respective computers and designed to communicate with each other using appropriate protocols. These protocols may include HTTP, TCP/IP, or other specialized protocols depending on the nature of the data being exchanged and the security requirements of the system. In certain embodiments, a server transmits data or instructions to a user's device, such as a computer, smartphone, or tablet, acting as a client. The client device can then process the received information, display results to the user, and potentially send data or feedback back to the server for further processing or storage. This allows for dynamic interactions between the user and the system, enabling a wide range of applications and functionalities.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers:

obtaining schema data specifying a schema for a summary of a content item, the content item comprising a sequence of segments;

initializing a structured summary of the content item, comprising:

processing a first input comprising a first segment in the sequence using a generative neural network to generate a structured summary of the first segment according to the schema; and initializing, using the structured summary of the first segment, the structured summary of the content item;

for each additional segment in the sequence:

processing a respective additional input comprising the additional segment using the generative neural network to generate a structured summary of the additional segment according to the schema; and processing one or more respective combining inputs comprising the structured summary of the additional segment and the structured summary of the content item using the generative neural network to update the structured summary of the content item; and processing at least the structured summary of the content item after being updated for the last segment in the sequence to generate a final output for the content item.

2. The method of claim 1, wherein the first input comprises the first segment and the schema data.

3. The method of claim 1, wherein the respective additional input comprises the additional segment and the schema data.

4. The method of claim 1, wherein the respective combining input comprises the structured summary of the additional segment and the structured summary of the content item and the schema data.

5. The method of claim 1, wherein the schema specifies a plurality of keys relating to the content item and wherein each structured summary includes one or more respective values for each of one or more of the keys.

6. The method of claim 1, wherein the schema is a schema for a particular structured data format and wherein each structured summary conforms to the particular structured data format.

7. The method of claim 6, wherein the particular structured data format is JavaScript Object Notation (JSON), YAML, or XML.

8. The method of claim 1, wherein processing one or more respective combining inputs comprising the structured summary of the additional segment and the structured summary of the content item using the generative neural network to update the structured summary of the content item comprises:

processing a first combining input that comprises the (i) the structured summary of the additional segment, (ii) the structured summary of the content item, and (iii) a first prompt that instructs the generative neural network to identify whether any keys in the structured summary of the content item need to be updated given the structured summary of the additional segment using the generative neural network to generate an update output that defines an update to the structured summary of the content item.

9. The method of claim 8, wherein the first prompt instructs the generative neural network to sequentially (i) identify the keys in the structured summary of the content item, (ii) identify any relevant keys in the structured summary of the additional segment, and (iii) generate an update output using values for the relevant keys in the structured summary of the additional segment.

10. The method of claim 8, wherein the schema is a schema for a particular structured data format and wherein each structured summary conforms to the particular structured data format;

and wherein the update output specifies a query in the particular structured data format.

11. The method of claim 1, wherein processing one or more respective combining inputs comprising the structured summary of the additional segment and the structured summary of the content item using the generative neural network to update the structured summary of the content item comprises:

processing a second combining input that comprises the (i) the structured summary of the additional segment, (ii) the structured summary of the content item, and (iii) a second prompt that instructs the generative neural network to identify whether any keys from the structured summary of the additional segment need to be added as new keys to the structured summary of the content item using the generative neural network to generate an update output that defines an update to the structured summary of the content item.

12. The method of claim 11, wherein the second prompt instructs the generative neural network to sequentially (i) identify the keys in the structured summary of the additional segment, (ii) identify any keys in the structured summary of the additional segment that are not in the structured summary of the content item, and (iii) generate an update output from the identified keys in the structured summary of the additional segment.

13. The method of claim 11, wherein the schema is a schema for a particular structured data format and wherein each structured summary conforms to the particular structured data format;

and wherein the update output specifies a query in the particular structured data format.

14. The method of claim 1, wherein processing at least the structured summary of the content item after being updated for the last segment in the sequence to generate a final output for the content item comprises:

processing an input comprising at least the structured summary of the content item after being updated for the last segment in the sequence using the generative neural network to generate a final summary of the content item.

15. The method of claim 14, wherein the final summary is a structured summary in accordance with the schema.

16. The method of claim 14, wherein the final summary is a natural language summary.

17. The method of claim 1, wherein the content item is a collection of documents relating to a particular set of one or more entities and wherein each segment is a respective document from the collection.

18. The method of claim 17, further comprising:

obtaining a search query relating to the particular set of one or more entities;

providing the search query to an Internet search engine; and obtaining, in response to the search query and from the Internet search engine, search results identifying the collection of documents.

19. The method of claim 17, wherein the final output is a summary of the collection of documents.

20. The method of claim 19, wherein the summary of the collection of documents is a natural language summary.

21. The method of claim 17, wherein the final output is a digital media item characterizing the particular set of one or more entities.

22. The method of claim 21, wherein the digital media item comprises audio data, image data, or video data.

23. The method of claim 1, wherein the generative neural network is an auto-regressive token generation neural network.

24. The method of claim 23, wherein the generative neural network comprises one or more self-attention layers.

25. A system comprising:

one or more computers; and one or more storage devices communicatively coupled to the one or more computers, wherein the one or more storage devices store instructions that, when executed by the one or more computers, cause the one or more computers to perform the operations, the operations comprising:

obtaining schema data specifying a schema for a summary of a content item, the content item comprising a sequence of segments;

initializing a structured summary of the content item, comprising:

processing a first input comprising a first segment in the sequence using a generative neural network to generate a structured summary of the first segment according to the schema; and initializing, using the structured summary of the first segment, the structured summary of the content item;

for each additional segment in the sequence:

processing a respective additional input comprising the additional segment using the generative neural network to generate a structured summary of the additional segment according to the schema; and processing one or more respective combining inputs comprising the structured summary of the additional segment and the structured summary of the content item using the generative neural network to update the structured summary of the content item; and processing at least the structured summary of the content item after being updated for the last segment in the sequence to generate a final output for the content item.

26. One or more non-transitory computer storage media storing instructions that when executed by one or more computers cause the one or more computers to perform the operations, the operations comprising:

obtaining schema data specifying a schema for a summary of a content item, the content item comprising a sequence of segments;

initializing a structured summary of the content item, comprising:

processing a first input comprising a first segment in the sequence using a generative neural network to generate a structured summary of the first segment according to the schema; and initializing, using the structured summary of the first segment, the structured summary of the content item;

for each additional segment in the sequence:

processing a respective additional input comprising the additional segment using the generative neural network to generate a structured summary of the additional segment according to the schema; and processing one or more respective combining inputs comprising the structured summary of the additional segment and the structured summary of the content item using the generative neural network to update the structured summary of the content item; and processing at least the structured summary of the content item after being updated for the last segment in the sequence to generate a final output for the content item.

* * * * *